Aug. 14, 1928. 1,680,808

C. SCHÜTZ

CONTROL MECHANISM

Filed Dec. 27, 1923   5 Sheets-Sheet 2

Inventor:
Conrad Schütz,
By
Attorney.

Aug. 14, 1928.

C. SCHÜTZ 1,680,808

CONTROL MECHANISM

Filed Dec. 27, 1923   5 Sheets-Sheet 3

Inventor:
Conrad Schütz,
By ........
Attorney.

Patented Aug. 14, 1928.

1,680,808

UNITED STATES PATENT OFFICE.

CONRAD SCHÜTZ, OF PHILADELPHIA, PENNSYLVANIA, ASSIGNOR TO LIEBERMAN MANUFACTURING COMPANY, A CORPORATION OF DELAWARE.

CONTROL MECHANISM.

REISSUED

Application filed December 27, 1923. Serial No. 682,991.

My invention is primarily designed to provide means for effecting the control of mechanisms comprised in or ancillary to fabricating machines, but it is applicable to various uses where power is to be transmitted at predetermined periods. My improvements are particularly applicable to fabricating machines, (such as full fashioned hosiery knitting machines) having mechanism for varying the fabricating effect, (such as mechanism for narrowing the hosiery fabric). When applied to such machines, my improvements automatically stop the fabricating machine and also automatically control the varying mechanism at predetermined times.

In the form in which I prefer to embody my improvements, there is provided a reciprocable power transmitting member connected with switch, belt shifter or the like, hereinafter referred to as the power controller, and provided with a movable contact block, which may be positioned in the path of a cam on the machine to transmit power through the reciprocable member to throw the switch or belt shifter. The positioning of the block is controlled by a slide which is reciprocable into and out of the path of a catch on the power transmitting member and a link on the block. Springs connected with the slide tend to shaft it out of the path of the catch and link; the slide being shifted into such path by means of an automatically disengaging hook. The slide is secured in its engaging position by a latch or trigger, which is retracted through cams on a disk or rotatable body controlled by speed reducing apparatus driven from the machine. Upon the retraction of the trigger, the slide is drawn by its springs against the periphery of the disk which contains slots adjacent to the disk cams. When the rotation of the disk brings a slot in its periphery into registration with the slide, the latter is further moved by its springs out of the path of the link and catch, and the contact block is dropped into position for engagement with a cam driven by the machine, which thereupon shifts the power transmitting member to operate the power controller. When the movement of the slide is manually reversed through the automatically disengaging hook, the catch on the power transmitting member slips past the slide and locks the member, while the end of the link engages the slide and tilts the hinged contact block out of the path of the actuating cam.

The speed reducing apparatus rotates a further disk having a recessed periphery. A link for disengaging parts of the varying mechanism of the machine is controlled by a finger riding on the disk periphery. When the finger has reached the end of a disk recess, it is shifted out of such recess and onto the periphery of the disk by a spring pressed slide controlled by further cams driven from the speed reducing apparatus.

The characteristic features and advantages of my improvements will more fully appear from the following description of a preferred embodiment and application of my invention, and the accompanying drawings in illustration thereof. In the accompanying drawings.

Figure 1:
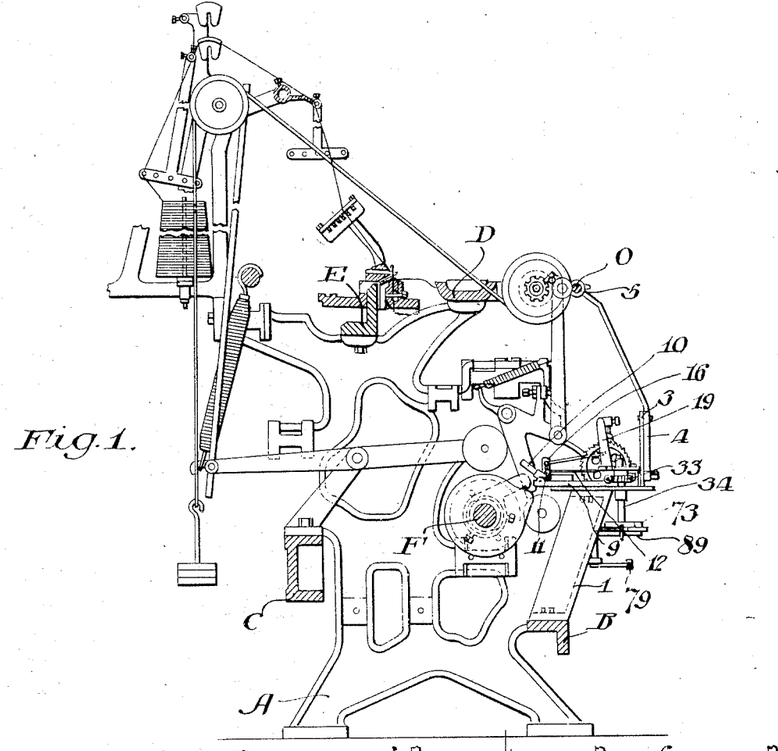
Fig. 1 is a transverse sectional view of a full fashioned knitting machine having my control mechanism applied thereto.
Figure 2:
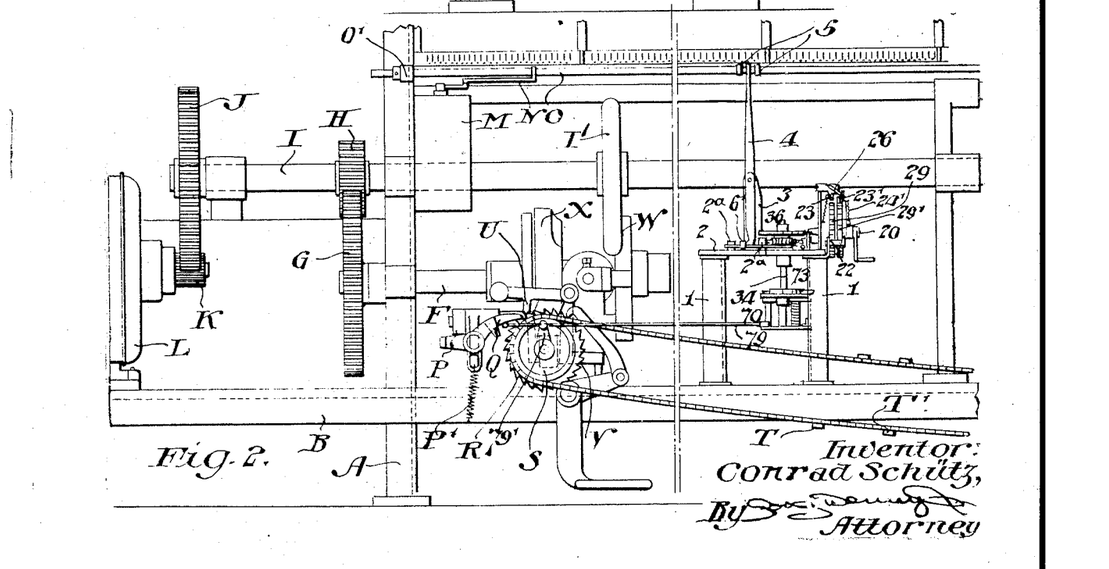
Fig. 2 is an enlarged front elevation of an end of such knitting machine, with my control mechanism in position.

As illustrated in the drawings, my improved control mechanism is applied to a full fashioned knitting machine of usual construction (Figs. 1 and 2) comprising a frame consisting of end members or legs A, rafters B and C and beds D and E. A shaft F is journalled in bearings in the legs A and has fixed thereto suitable cams whereby the mechanisms involved in the knitting operations are controlled. The shaft F has fixed on the end thereof a gear G through which power is transmitted from a pinion H on the hand wheel shaft I. The shaft I has fixed thereto the usual hand wheels I' for affecting manual rotation of the shaft I, which, however, is normally driven through an end gear J meshing with the pinion K of an electric motor L. The current supplied to the motor is controlled by a switch box M from which projects a control lever N linked to the reciprocatory control rod O which slides in bearings O' of the machine frame. The cam shaft F also has connected therewith suitable cam mechanism P for rocking the pawl Q into engagement with the ratchet teeth R of the chain wheel S to advance such chain wheel one step for each revolution of the main cam shaft. The wheel S translates the chain T having thereon buttons T' which engage the lever U to release the catch V and permit movement of the cams W and X for operating the narrowing mechanism of the knitting machine.

In the usual operation of hosiery-knitting machines of the type illustrated, it is necessary for the operative manually to (1) stop the machine when sufficient courses have been knit to form a fabric of the length desired for forming the double top or welt to permit the welt to be turned by means of the welting bar: (2) to manually bring the narrowing mechanism into operation to narrow the upper leg: (3) to again manually stop the machine to permit substitution of silk for the cotton yarn commonly used for the upper part of the stocking; (4) to again manually bring the narrowing mechanism into operation to narrow the calf of the leg; (5) to again manually stop the machine to permit the insertion of the additional yarn for forming the high heel: (6) to again manually stop the machine for the formation of the heel tabs: (7) to again manually bring the narrowing mechanism into operation for narrowing the heel tabs; and (8) to again manually stop the machine upon the completion of the stocking leg.

Inattention or inefficiency on the part of operatives in charge of machines results in the stopping of the machine and the actuation of the narrowing mechanism at improper times, with resulting waste of material and the production of hosiery having irregular sections and irregular lengths, thereby necessitating careful sorting to secure approximately evenly matched pairs.

A leading object of my invention is to provide means whereby the stopping of the knitting machine and the actuation of the narrowing mechanism are automatically effected, at predetermined intervals, after the knitting of fabric sections of desired length; provision being made for compensating for variations in the thread, particularly silk due to changes of climatic conditions and the length of fabric knitted therefrom. By the use of my improvements, stockings of constant uniformity are produced, with resulting economy and avoidance of necessity for matching.

To accomplish the foregoing desiderata and effect the automatic control of the stoppage and of the narrowing mechanism of the knitting machine illustrated, I mount upon the rafter B (Figs. 1, 2, 3) struts 1 which support a table 2 provided with a vertical standard 3. A lever 4, fulcrumed on the standard 3, has its upper end disposed between the collars 5 on the control rod or shift-element O, while its lower end lies in the path of a bracket 6' carried by the sliding bar 6 reciprocable in the table ways 2a.

Figure 3:
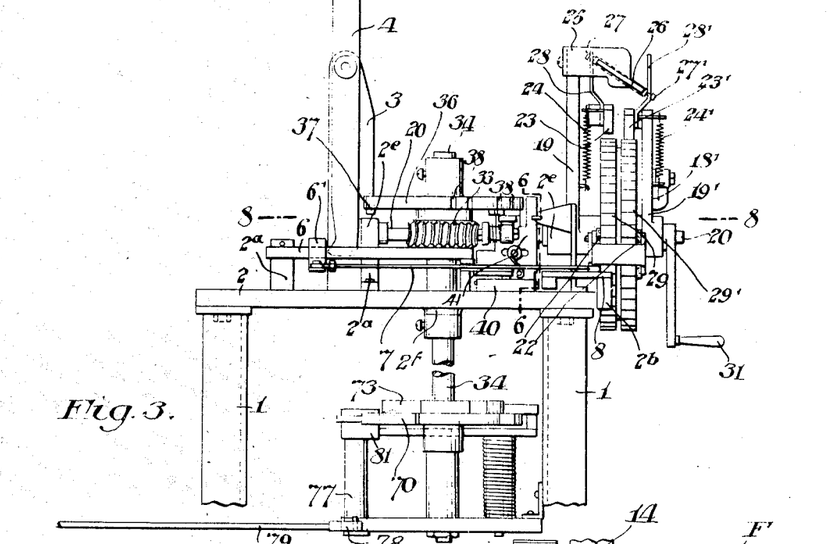
Fig. 3 is an enlarged front view of my control mechanism detached from the knitting machine.
Figure 4:
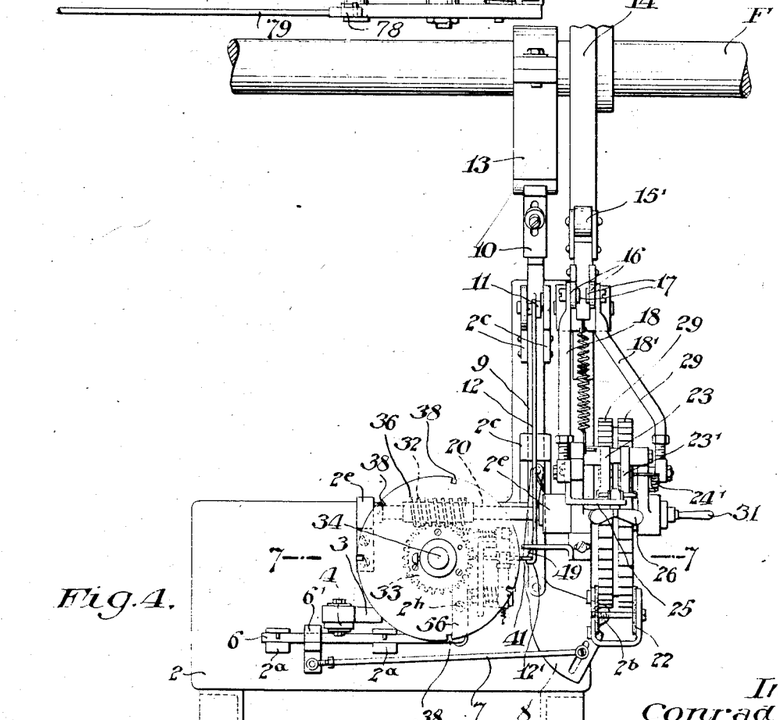
Fig. 4 is a top plan view of the control mechanism, together with the cams and a section of the knitting machine cam shaft.
Figure 5:
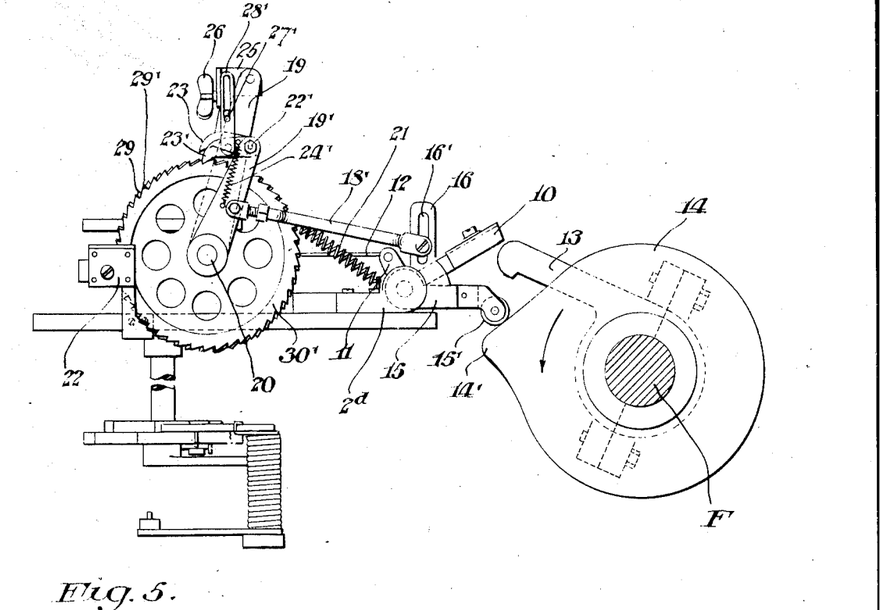
Fig. 5 is an enlarged detached view of the control mechanism and cams from the side opposite that shown in Fig. 1, parts being omitted for the sake of clearness.
Figure 8:
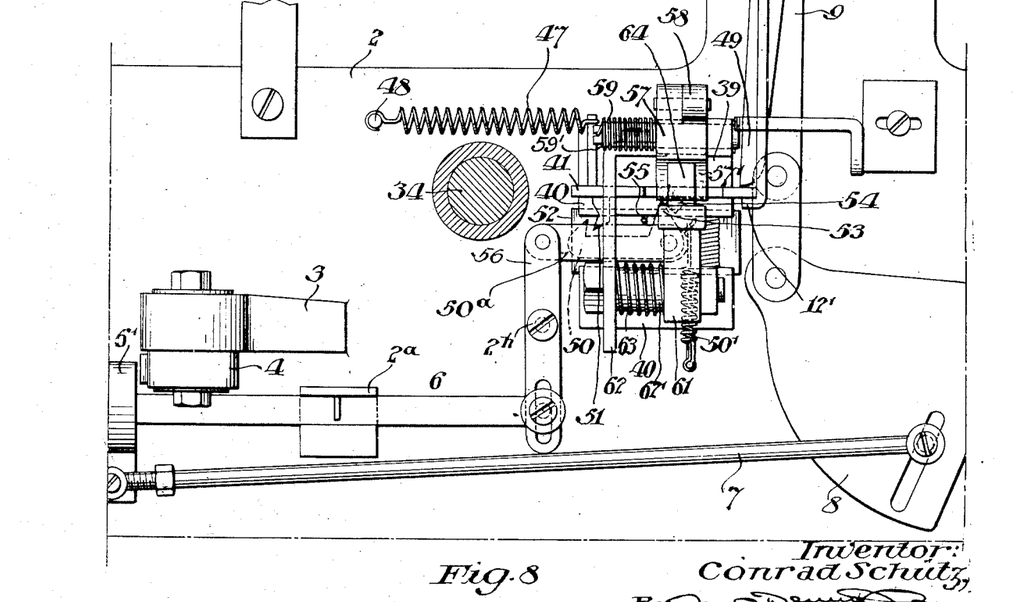
Fig. 8 an enlarged top plan view on the plane of section line 8, 8 of Fig. 3 of the stopping mechanism with parts omitted for the sake of better illustration.
Figure 9:
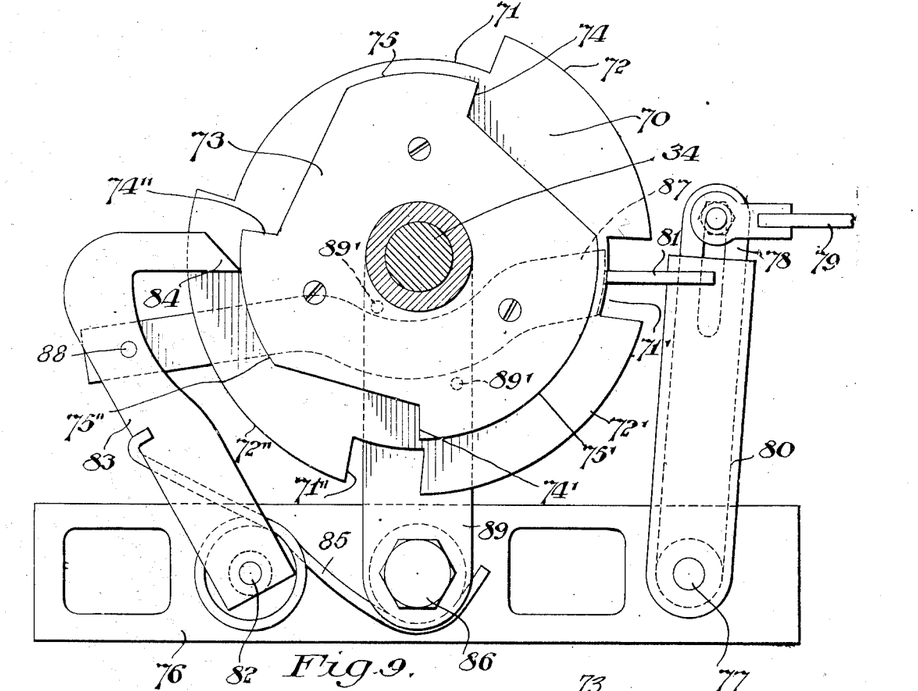
Fig. 9 is a top plan view, taken from the rear, of the mechanism for controlling the narrowing or varying mechanism of the machine.
Figure 10:
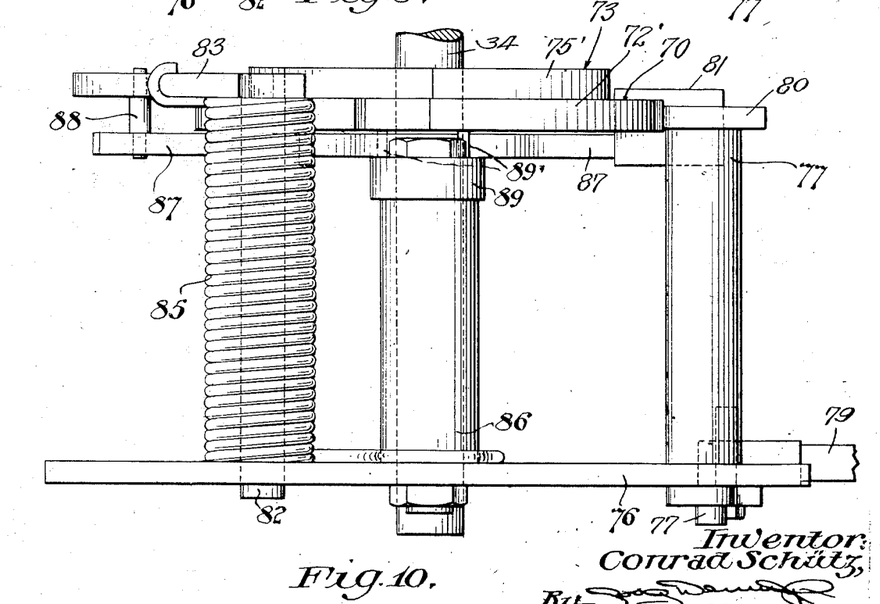
Fig. 10 is an elevation of the mechanism shown in Fig. 9.

The bracket 6' is connected by the pivoted adjustable link 7 with a quadrant plate 8 fulcrumed on the bearing 2b on the table. (Figs. 3, 4, 8). The quadrant has pivotally connected therewith one end of a slide bar 9, reciprocable in the table bearings 2c, and having hinged to the other end thereof a contact block or shoe 10. An arm 11, projecting from the shoe, has pivoted thereto a link 12 (Figs. 4, 5) whereby the contact block may be elevated out of the path of a cam 13 on the shaft F, which transmits power through the block 10 and connected parts to rock the lever 4 when the block 10 is in lowered position. In other words, the reciprocating mechanism which communicates movement from cam 13 to lever 4, includes the slides 6 and 9 and the block 10.

A cam 14, fixed on the cam shaft F, is provided with a shoulder 14' which, on each revolution of the shaft, contacts with a roller 15' journalled between the arms 15 of a bell crank fulcrumed on the table bearing 2d. The arms 16 of this bell crank contain slots 16' in which are adjustably fixed bearings 17 having links 18, 18' pivotally connected therewith. The links 18, 18' are pivotally connected with the arms 19, 19' journalled loosely on a shaft 20 journalled in a bearing 2e on the table 2.

The arms 19, 19' are normally drawn toward the shaft F by a spring 21, and have pivoted thereto the pawls 23, 23', which are normally drawn downward by the coiled springs 24, 24' fixed to the respective arms 19, 19'. A bracket 25, fixed to the arm 19, has journalled therein a finger piece or wing nut 26 provided with the diametrical arms 27, 27' connected by the slotted links 28, 28' with the pawls 23, 23'. By rocking the member 26, the pawls are respectively rocked into and out of position for engaging the ratchet teeth 29, 29' of the respective ratchet wheels 30, 30' which are fixed to the shaft 20 and controlled by the friction brake pieces 22.

The ratchet teeth on the wheels 29, 29' differ in number and length so that by throwing one or other of the pawls 23, 23' into engagement with its corresponding ratchet teeth the rate of rotation of the shaft 20 may be varied to compensate for climatic conditions affecting the thread, as hereinafter explained. If desired, a handle 31 may be fixed to the shaft 20 to effect manual rotation thereof.

Figure 6:
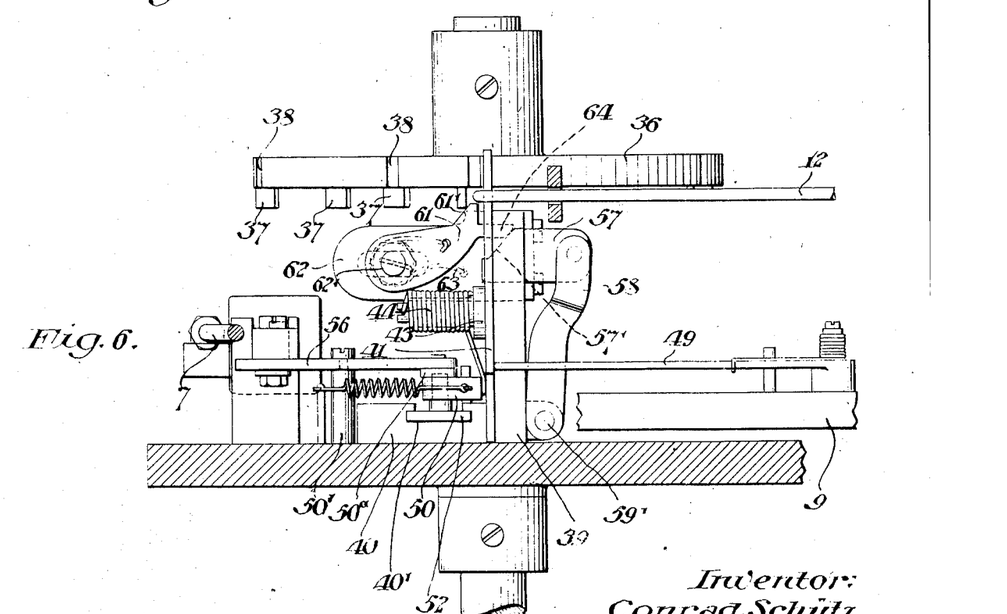
Fig. 6 is a vertical section on line 6, 6 of Fig. 3 on enlarged scale.

The shaft 20 has thereon a worm 32 which meshes with the teeth of a worm gear 33 fixed to a shaft 34 mounted in a bearing 2f of the platform 2. A disk 36, fixed to the shaft 34 above the gear 33, has depending therefrom cams or lugs 37 and contains peripheral slots or recesses 38 positioned adjacent to the lugs 37. (Figs. 3, 4, 6).

Figure 7:
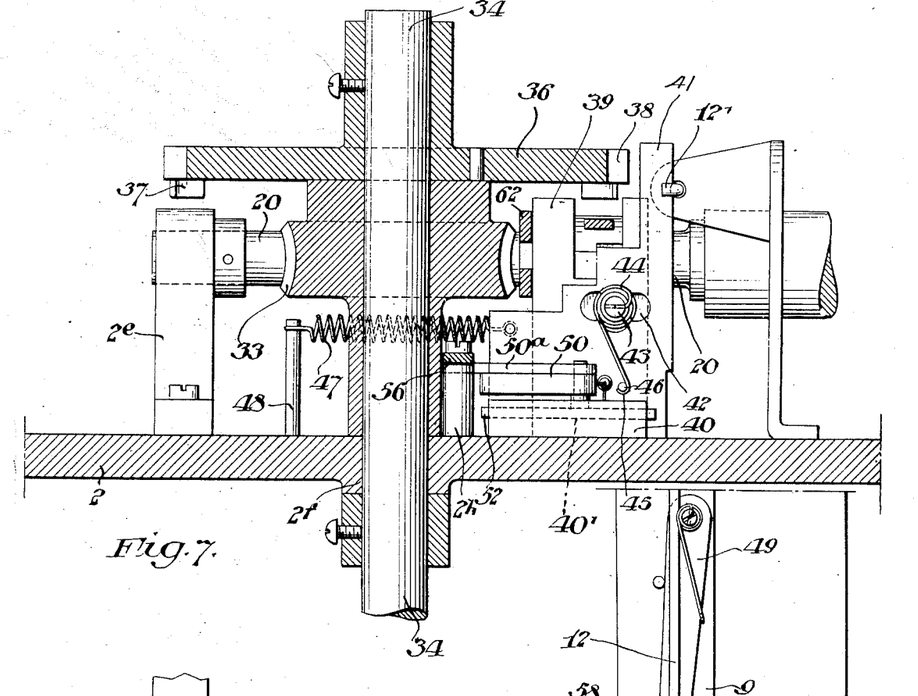
Fig. 7 is an enlarged sectional view of the same mechanism on line 7, 7 of Fig. 4.

A post 39 and block 40, fixed to the table 2, provide a guideway for the lower end of a slide 41, which is reciprocable transversely to the direction of reciprocation of the slide 9. A keeper 43, fixed to the standard 39, projects through a slot 42 in the slide 41 and has coiled thereon a spring 44 provided with a looped end 45 engaging the pin 46 on the slide plate 41, whereby the latter is maintained in vertical position and normally urged toward the left, as shown in Fig. 7. A coiled spring 47 is also connected with the slide plate 41 and anchored to a post 48 to supplement the action of the spring 44.

The slide bar 9 has pivoted thereon a spring pressed latch 49, the end of which engages the slide plate 41 when the slide bar 9 is advanced toward the shaft F and the slide 41 is moved to the right against the resistance of the springs 44 and 47. In such position of the parts, the hooked end 12' of the link 12 engages the slide 41 so as to elevate the contact block. The slide 41 is translated toward the right (Fig. 8) against the resistance of the springs 44 and 47 by a hook 50 normally pressed by a spring 50' into engagement with a tooth or stud 51 on the slide 41. This hook 50 is pivoted on a slide 52 reciprocable in the guideway 40' of the block 40, and is disengaged from the tooth 51 by the engagement of a cam shoulder 53 with a stud 54 on the block 40. The movement of the hook is limited by a pin 55.

The hook 50 has pivotally connected with the end thereof a link 50a which is pivoted to the end of a lever 56 fulcrumed on the pivot 2h. The opposite end of the lever 56 is slotted and adjustably connected with the bar 6.

When the slide plate 41 has been shifted to the right by the mechanism just described, it is latched in such position by a trigger 57 which slides through the post 39 into the path of said slide plate. This trigger is normally pressed forward into position for engaging the slide plate by a link 58 fixed on a shaft 59'. A spring 59 is anchored to this shaft and to the base 2 and tends to turn the shaft and press the trigger inward.

A dog 61, mounted on a pivot 62' adjustably connected with a bracket 62 projecting from the post 39, is normally pressed upward toward the disk 36 by a spring 63. The dog 61 has a cam tooth 61' which is adapted for engagement with the lugs 37 on the disk 36 and has a finger 64 adapted for engagement with the inclined face 57' of the trigger 57.

A disk 70 is fixed to the lower portion of the shaft 34 and contains the peripheral recesses 71, 71' and 71" spaced by the peripheral curved segments 72, 72' and 72". A plate 73, fixed to the disk 70, is provided with cams 74, 74' and 74" separated by curved peripheral segments 75, 75' and 75".

A frame 76, fixed to the struts 1, 1, has journalled therein a shaft 77 having a projecting arm 78 to which is pivotally connected a link 79. The link 79 is reciprocable through a bearing 79' into engagement with the pawl Q, which is thereby disengaged from the ratchet R to prevent the action of the narrowing mechanism. When the link 79 is moved away from the pawl Q, the spring P' moves the pawl into engagement with the ratchet R to effect the actuation of the narrowing mechanism. The shaft 77 is rocked about its axis by an arm 80 fixed to the shaft and having a finger 81 which rides on the periphery of the disk 70.

A shaft 82, journalled in the frame 76, has fixed thereto an arm 83, provided with a finger 84 which rides on the periphery of the plate 73. The arm is engaged by an end of a spring 85 coiled on the shaft 82 and anchored to the post 86. A slide 87 is connected with the arm 83 by a pintle 88 and is guided beneath the disk 70 by the guides 89' on a bracket 89.

In the operation of the knitting machine, the control bar O is shifted to the left (Fig. 2) to operate the controller, shown in the present example, as the switch in the box M to turn off the current and stop the machine, and to the right to turn on the current and start the machine. The lever 4 and rod O are so connected by the collars 5 that the movement of one effects movement of the other.

With the mechanism in the position shown in Figs. 1, 4, 5 and 8 of the drawings, and the knitting machine operating, it will be observed that the slide bar 9 is advanced toward the shaft F and is held in this advanced position by the engagement of the catch 49 with the slide 41, which is in its extreme right hand position, where it is held by the engagement of the trigger 57. The contact block 10 is elevated by the engagement of the link 12 with the slide 41 so that the cam 13 on the shaft F may rotate without engaging the contact block.

The revolution of the shaft F causes the shoulder 14' on the cam 14 to rock the crank arms 15 and, through the crank arms 16, 16' and links 18, 18', to advance the arms 19, 19'. The handle 26 having been turned to bring either the pawl 23 or the pawl 23' into position to engage the ratchet teeth 29 or 29', each rotation of the shaft F acts through the intermediate mechanism to rotate the shaft 20 one step. The length of such step is dependent upon whether the pawl 23 engages the ratchet teeth 29 or whether the pawl 23' engages the ratchet teeth 29'. This variability in the step by step movement is provided to compensate for the difference in the thread in wet and dry weather. In wet weather, silk particularly tends to stretch and hence a greater number of courses are required to knit a fabric of a given length, while in dry weather a fewer number of courses will knit a fabric of the same length. Hence as it is desired that the machine be stopped after a fabric of predetermined length has been knitted, the operation of the stop mechanism is adjusted by means of the pawls to compensate for the different number of courses required to knit a fabric of given length under different climatic conditions.

The rotation of the shaft 20 acts through the worm 32 and worm wheel 33 to rotate the shaft 34 and disks 36 and 70. The rotation of the disk 36 brings one of the lugs 37 into position to engage the inclined portion of tooth 61' of the dog 61, which is thereby depressed so that the finger 64, acting on the inclined surface 57', retracts the trigger 57 to release the slide 41 therefrom. The edge of the slide 41 thereupon engages the periphery of the disk 36 and is held against the full action of its springs 44 and 47 until a slot 38 in the periphery of the disk 36 comes into registration therewith. The slide 41 is then immediately thrown by its springs 44 and 47 to the left (Figs. 2, 7) so as to disengage the member 12 and the catch 49. The disengagement of the member 12 permits the contact block 10 to drop into the path of the cam 13. Upon the next rotation of the shaft F, the cam 13 pushes back the slide 9 which acts through the quadrant 8 and link 7 to rock the lever 4 which acts through the rod O to stop the machine. To again start the machine, the operator manually shifts the rod O in the reverse direction, which acts through the collars 5, lever 4, bracket 6', link 7, and quadrant 8 to advance the slide 9. Simultaneously therewith the bar 6 is operated by the bracket 6' to rock the lever 56, which, through the link 50ª rocks the hook 50. The hook 50 engages the tooth 51 of the slide 41 and moves it toward the right into the path of the overturned end 12' of the member 12 and into the path of the catch 49 on the slide 9. The catch, being yieldingly mounted, slips past the slide 41 but as soon as it has done so its spring turns it into position in front of the slide 41, thereby keeping the slide 9 advanced. The engagement of the end 12' with the slide 41 causes the contact block 10 to be turned on its hinge upward out of the path of the cam 13, when the slide 9 is advanced. When the slide 41 has been moved sufficiently to the right, the trigger 57 is projected by its spring into the path of the slide, and thereupon the hook 50 is moved further to the right so that its shoulder 53 contacts with the stud 54, whereby the hook is rocked on its pivot out of engagement with the tooth 51, so that the slide 41 is in position to be released when the trigger 57 is again retracted by the engagement of a lug 37 with the tooth 61'. The movement of the hook 50 is limited by the pin 55.

During the operation of the knitting machine, the disk 70 is rotated by the speed reducing apparatus through the shaft 34. During the knitting of fabric of normal width, the finger 81 rides on a peripheral segment 72, 72' or 72" so that the rod 79 is held in position to maintain the pawl Q out of engagement with the ratchet on wheel S thereby rendering inoperative the narrowing mechanism. When, however, the finger 81 drops into a recess 71, 71' or 71" the pawl Q is shifted by its spring P' into engagement with the ratchet on the chain wheel to actuate the narrowing mechanism. During the period the finger 81 is in the recess 71, 71' or 71" the finger 84 rides on a peripheral segment 75, 75' or 75", thereby retracting the slide 87. As soon as the finger 84 reaches the end of the segment on which it is riding, it drops down over the adjacent cam 74, 74' or 74", whereupon the spring 85 rocks the arm 83, which shifts the slide to move the finger 81 out of the recess 71, 71' or 71" and on to a peripheral segment 72, 72' or 72", where it rides during the narrowing of the fabric.

While I have described a specific form and application of my improvements, it is to be understood that my invention is not limited to the specific form or use described.

Having described my invention, I claim:—

1. An automatic control for fabricating machines, comprising a power controller, a shift element for operating the same, a lever for operating the shift element, a reciprocating mechanism and a cooperating cam for actuating the lever, said reciprocating mechanism having an element adapted to move into and out of the path of the cam, and means comprising a disc rotating synchronously with the machine and provided with peripheral recesses and means cooperating therewith for rendering the cam actuation ineffective during predetermined periods.

2. An automatic control for fabricating machines, comprising a power controller, a shift element for operating the same, a lever adapted to operate and to be operated by the shift element, a reciprocating mechanism adapted to actuate and to be actuated by the lever, an actuating cam for cooperating with the reciprocating mechanism, said reciprocating mechanism having an element adapted to move into and out of the path of the cam, and means comprising a disc rotating synchronously with the machine and provided with peripheral surfaces and recesses and means including latching and releasing devices cooperating with said peripheral surfaces and recesses for rendering the cam actuation ineffective during predetermined periods.

3. Automatic control for fabricating machines, including narrowing mechanism, comprising a power controller, means for actuating said controller at predetermined intervals, and means operating synchronously with the machine, including a rotating element provided with recesses and engaging peripheral surfaces, means for operating the narrowing mechanism, and means for establishing operative relationship between said rotating element and said operating means for controlling the narrowing mechanism.

4. Automatic control for fabricating machines, including narrowing mechanism, comprising a power controller, means for actuating the controller at predetermined intervals, and means operating synchronously with the machine, including a disc having peripheral recesses and spaced peripheral curved segments, and a plate attached thereto having cams separated by curved peripheral segments, and a pawl and ratchet mechanism, and means for establishing operative relationship between said disc and plate and said pawl and ratchet for controlling the narrowing mechanism.

5. In an automatic control for power driven fabricating machines, the combination of a rotatable disk, means operating synchronously with the machine, for rotating the disk, a plurality of detent engaging elements, secured to the disk in required spaced relationship and adjacent its periphery, a cooperating detent, and mechanism controlled by the detent for controlling the power.

6. In an automatic control for power driven fabricating machines, the combination of a rotatable disk, means including a pawl and ratchet and a reducing gear, operating synchronously with the machine, for rotating the disk, a plurality of detent engaging elements secured to the disk in required spaced relationship and adjacent its periphery, a cooperating detent, and mechanism controlled by the detent for controlling the power.

7. In an automatic control for power driven fabricating machines, the combination of a rotatable disk, means for causing a step by step rotative movement of the disk including a reducing gear operating synchronously with the machine, for rotating the disk, a plurality of detent engaging elements, secured to the disk in required spaced relationship and adjacent its periphery, a cooperating detent and mechanism controlled by the detent for controlling the power.

8. In an automatic control for power driven fabricating machines, the combination of a power controller, a rotatable disk, means including a reducing gear, operating synchronously with the machine, for rotating the disk, a plurality of detent engaging elements secured to the disk in required spaced relationship and adjacent its periphery, a cooperating detent, and mechanism controlled by the detent for operating the power controller.

9. Means for effecting the control of power driven fabricating machines, comprising means automatically to stop the fabricating machine to control or vary the fabricating effect, including a rotatable body provided with cams secured to the body in spaced relationship adjacent its periphery, a pivoted element cooperating with the cams and mechanism controlled by the pivoted element for controlling the power.

10. Means for effecting the control of power driven fabricating machines, comprising means automatically to stop the fabricating machine to control or vary the fabricating effect, including a rotatable body, a pawl and ratchet and reducing gears for rotating the body synchronously with the machine, said body provided with cams secured to the body in spaced relationship adjacent its periphery, a pivoted element cooperating with the cams and mechanism controlled by the pivoted element for controlling the power.

11. Means for effecting the control of power driven fabricating machines, comprising means automatically to stop the fabricating machine to control or vary the fabricating effect, including a rotatable body means including a speed reducing gear driven from the machine for rotating the body, said body provided with cams secured to the body in spaced relationship adjacent its periphery, a pivoted element cooperating with the cams and mechanism controlled by the pivoted element for controlling the power.

12. An automatic control for power driven fabricating machines, comprising a power controlling shift element, a lever for operating the shift element, a rotatable disk and means for operating the same synchronously with the machine, cam elements secured to the disk in required spaced relationship adjacent its periphery and means operated by the cams for controlling the movement of the lever.

13. An automatic control for power driven fabricating machines comprising a power controlling shift element, a lever for operating the shift element, a rotatable disk and means for causing a step by step rotative movement through a reducing gear of the disk synchronously with the machine, cam elements secured to the disk in required spaced relationship adjacent its periphery and means operated by the cams for controlling the movement of the lever.

14. In an automatic control for knitting machines, the combination with an electric motor for driving the machine and a switch for controlling the motor, a rotating body, means, operating synchronously with the machine for rotating the body, cams secured to the body in spaced relationship and adjacent the periphery of the body, and means controlled by said cams for operating the switch.

In testimony whereof I have hereunto set my name this 22nd day of December, 1923.

CONRAD SCHÜTZ.